US012670218B2

(12) United States Patent
Shrivatsa Bhargav et al.

(10) Patent No.: US 12,670,218 B2
(45) Date of Patent: Jun. 30, 2026

(54) RULES-BASED SCHEMA-LINKING

(71) Applicant: International Business Machines Corporation, Armonk, NY (US)

(72) Inventors: G P Shrivatsa Bhargav, Bengaluru (IN); Saswati Dana, Bangalore (IN); Dinesh Khandelwal, Indore (IN); Dinesh Garg, Beawar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 18/057,783

(22) Filed: Nov. 22, 2022

(65) Prior Publication Data

US 2024/0168997 A1 May 23, 2024

(51) Int. Cl.
 G06F 17/00 (2019.01)
 G06F 16/903 (2019.01)
(52) U.S. Cl.
 CPC .............................. G06F 16/90344 (2019.01)
(58) Field of Classification Search
 CPC .................................................. G06F 16/90344
 See application file for complete search history.

(56) References Cited

U.S. PATENT DOCUMENTS

| | | |
|---|---|---|
| 11,321,615 B1 | 5/2022 | Genkin et al. |
| 2018/0232443 A1 | 8/2018 | Delgo et al. |

| | | |
|---|---|---|
| 2019/0034540 A1 | 1/2019 | Perkins et al. |
| 2020/0081899 A1 | 3/2020 | Shapur et al. |
| 2022/0129450 A1* | 4/2022 | Cao ..................... G06F 16/2433 |

OTHER PUBLICATIONS

Aiwei Liu et al., Semantic Enhanced Text-to-SQL Parsing via Iteratively Learning Schema Linking Graph. In Proceedings of the 28th ACM SIGKDD Conference on Knowledge Discovery and Data Mining. Association for Computing Machinery, 1021-1030. <https://doi.org/10.1145/3534678.3539294>, Aug. 2022.*
Lihan Wang et al., Proton: Probing Schema Linking Information from Pre-trained Language Models for Text-to-SQL Parsing. In Proceedings of the 28th ACM SIGKDD Conference on Knowledge Discovery and Data Mining. Association for Computing Machinery, 1889-1898, <https://doi.org/10.1145/3534678.3539305>, Aug.*

(Continued)

*Primary Examiner* — Greta L Robinson
(74) *Attorney, Agent, or Firm* — Amin, Turocy & Watson, LLP

(57) ABSTRACT

One or more systems, devices, computer program products and/or computer-implemented methods of use provided herein relate to a process for matching a word subset to a database entity. A system can comprise a memory that stores computer executable components, and a processor that executes the computer executable components stored in the memory, wherein the computer executable components can comprise an identification component that outputs a word subset based on a word-based input file, and a mapping component that, based on a rules-based process employing soft matching, maps the word subset to a category comprising a value for being correlated to the word subset. The rules-based process employed by the mapping component can comprise word vector matching or fuzzy string matching.

20 Claims, 10 Drawing Sheets

(56)    References Cited

OTHER PUBLICATIONS

Lei, et al., "Re-examining the Role of Schema Linking in Text-to-SQL," Proceedings of the 2020 Conference on Empirical Methods in Natural Language Processing, pp. 6943-6954, Nov. 16-20, 2020. (c) 2020 Association for Computational Linguistics.

Taniguchi, et al., "An Investigation Between Schema Linking and Text-to-SQL Performance," arXiv:2102.01847v1 [cs.CL] Feb. 3, 2021.

Wang, et al., "RAT-SQL: Relation-Aware Schema Encoding and Linking for Text-to-SQL Parsers," arXiv:1911.04942v5 [cs.CL] Aug. 24, 2021.

Scholak, et al., "PICARD: Parsing Incrementally for Constrained Auto-Regressive Decoding from Language Models," arXiv:2109.05093v1 [cs.CL] Sep. 10, 2021.

* cited by examiner

200

LINK-NGRAM FUNCTION 300

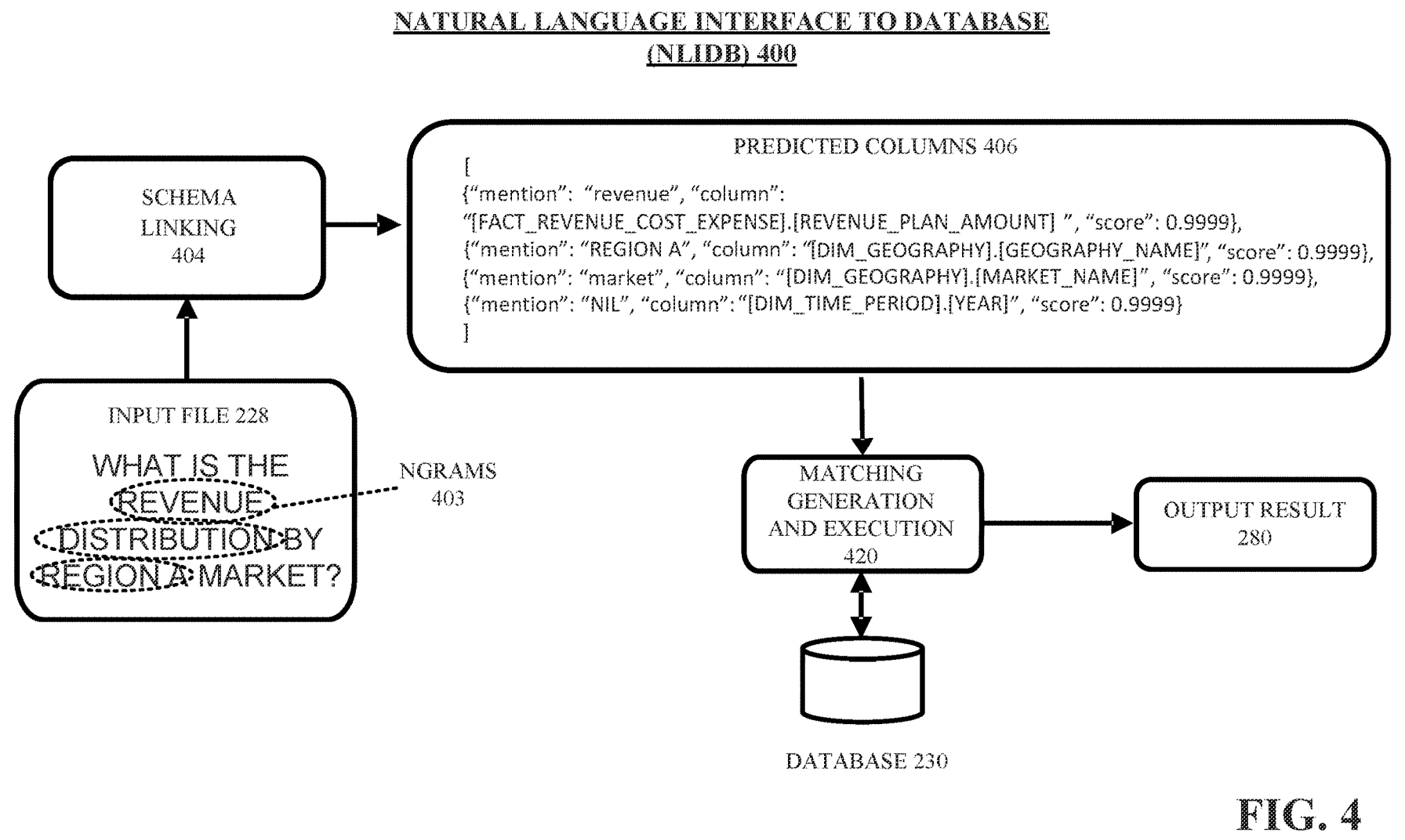

NATURAL LANGUAGE INTERFACE TO DATABASE
(NLIDB) 400

PREDICTED COLUMNS 406

[
{"mention": "revenue", "column":
"[FACT_REVENUE_COST_EXPENSE].[REVENUE_PLAN_AMOUNT] ", "score": 0.9999},
{"mention": "REGION A", "column": "[DIM_GEOGRAPHY].[GEOGRAPHY_NAME]", "score": 0.9999},
{"mention": "market", "column": "[DIM_GEOGRAPHY].[MARKET_NAME]", "score": 0.9999},
{"mention": "NIL", "column": "[DIM_TIME_PERIOD].[YEAR]", "score": 0.9999}
]

SCHEMA LINKING 404

INPUT FILE 228

WHAT IS THE REVENUE DISTRIBUTION BY REGION A MARKET?

NGRAMS 403

MATCHING GENERATION AND EXECUTION 420

OUTPUT RESULT 280

DATABASE 230

FIG. 4

LINK-NGRAM MATCHING 500

NGRAMS 403

START

PERFORM SOFT MATCHING OPERATION A FOR EACH NGRAM 502A

PERFORM SOFT MATCHING OPERATION B FOR EACH NGRAM 502B

PERFORM SOFT MATCHING OPERATION N FOR EACH NGRAM 502N

END

NON-DECLUSTERED OUTPUT RESULTS 550

AUXILIARY DATA 238

SLANGS 522
ALIASES 524
VALUE DICTIONARY 526
SEMANTIC TAGS 530
DOMAIN RULES 532

CATEGORIES 234

FIG. 6

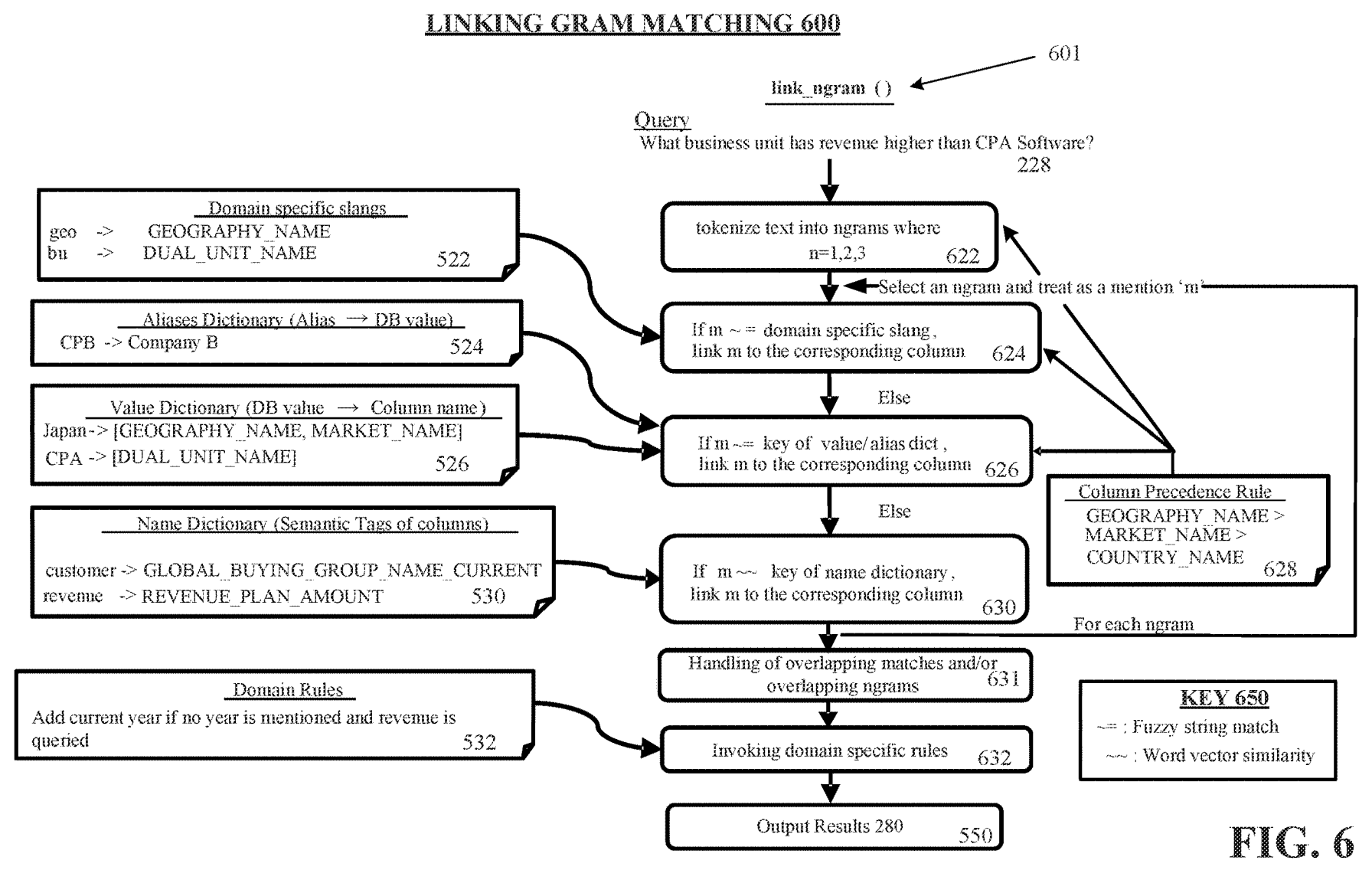

LINKING GRAM MATCHING 600

601 link_ngram ()

<u>Query</u>
What business unit has revenue higher than CPA Software?
228 tokenize text into ngrams where n=1,2,3   622

Select an ngram and treat as a mention 'm'

If m ~= domain specific slang, link m to the corresponding column   624

Else

If m ~= key of value/alias dict, link m to the corresponding column   626

Else

If m ~~ key of name dictionary, link m to the corresponding column   630

Handling of overlapping matches and/or overlapping ngrams   631 invoking domain specific rules   632

Output Results 280   550

For each ngram

<u>Column Precedence Rule</u>
GEOGRAPHY_NAME >
MARKET_NAME >
COUNTRY_NAME   628

<u>KEY 650</u>
~= : Fuzzy string match
~~ : Word vector similarity

<u>Domain specific slangs</u>
geo   ->   GEOGRAPHY_NAME
bn    ->   DUAL_UNIT_NAME
522

<u>Aliases Dictionary (Alias → DB value)</u>
CPB -> Company B   524

<u>Value Dictionary (DB value   →   Column name)</u>
Japan-> [GEOGRAPHY_NAME, MARKET_NAME]
CPA -> [DUAL_UNIT_NAME]   526

<u>Name Dictionary (Semantic Tags of columns)</u>
customer -> GLOBAL_BUYING_GROUP_NAME_CURRENT
revenue  -> REVENUE_PLAN_AMOUNT   530

<u>Domain Rules</u>
Add current year if no year is mentioned and revenue is queried   532

Figure 7:
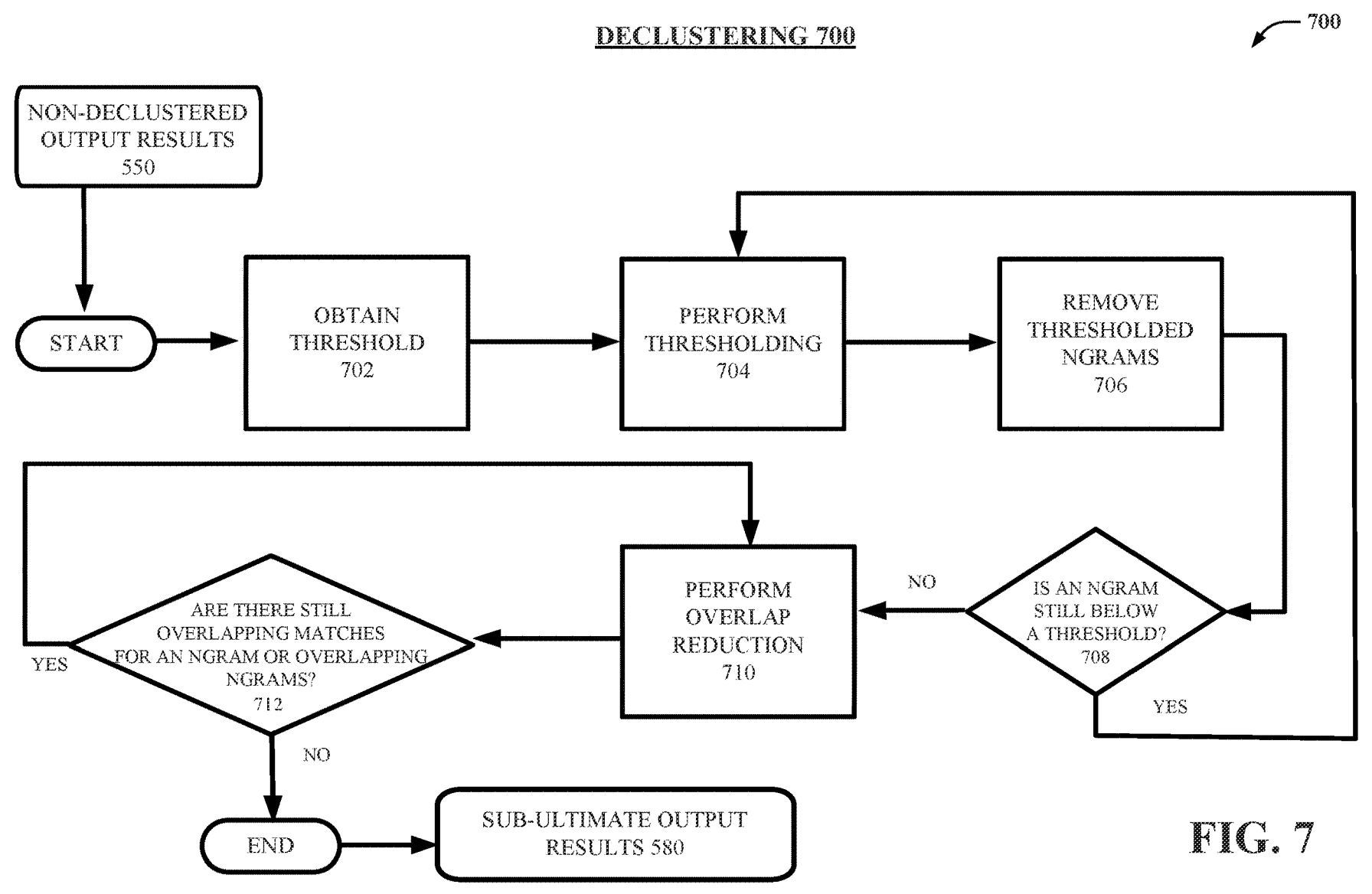

DECLUSTERING 700

NON-DECLUSTERED OUTPUT RESULTS 550

START

OBTAIN THRESHOLD 702

PERFORM THRESHOLDING 704

REMOVE THRESHOLDED NGRAMS 706

IS AN NGRAM STILL BELOW A THRESHOLD? 708

YES

NO

PERFORM OVERLAP REDUCTION 710

ARE THERE STILL OVERLAPPING MATCHES FOR AN NGRAM OR OVERLAPPING NGRAMS? 712

YES

NO

END

SUB-ULTIMATE OUTPUT RESULTS 580

DECLUSTERING 800

NON-DECLUSTERED OUTPUT RESULTS 550

GRAPH AFTER PARTIAL OVERLAP REDUCTION 804

SUB-ULTIMATE OUTPUT RESULTS 580

810

812

802

806

810

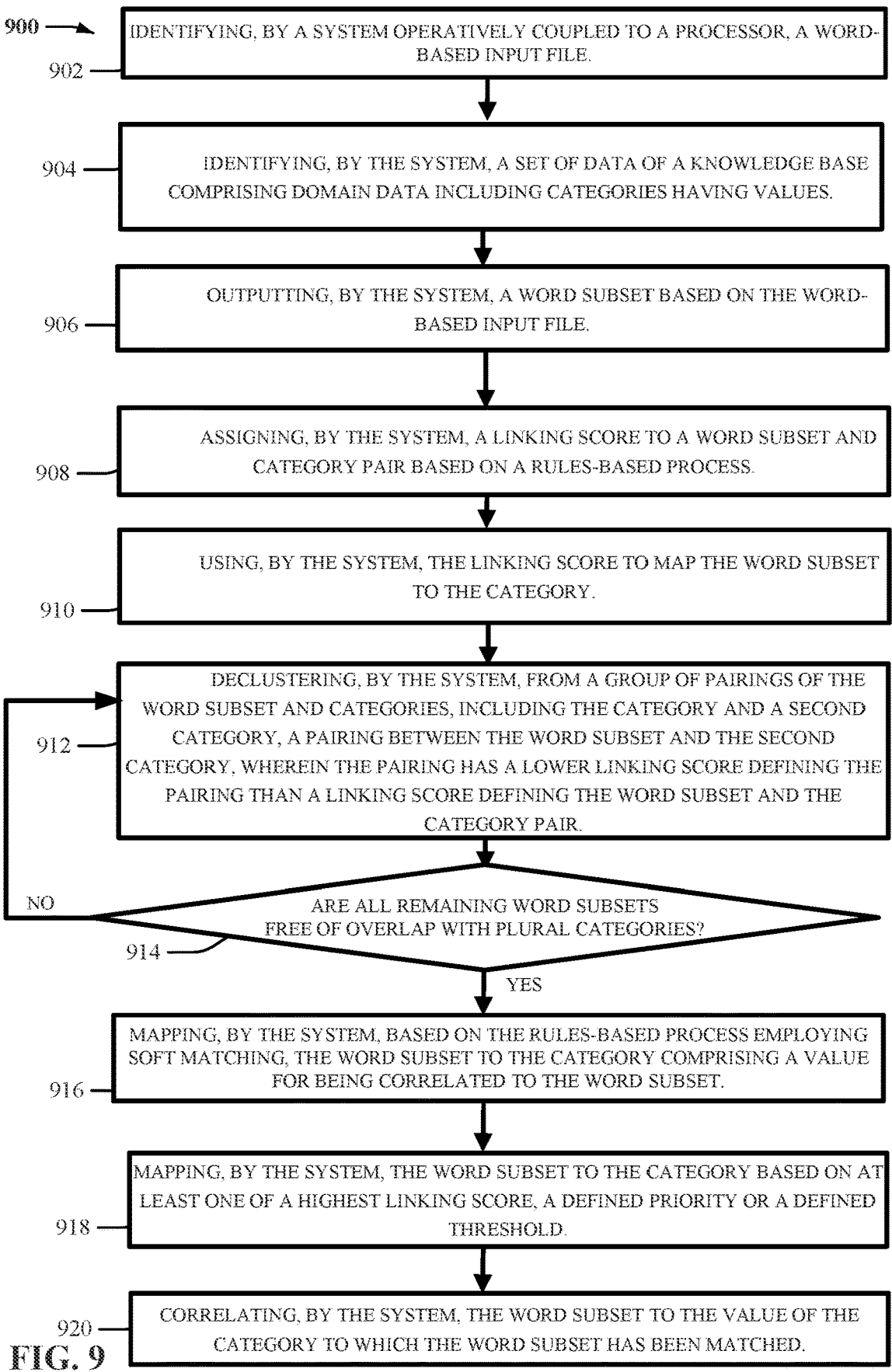

900

902 — IDENTIFYING, BY A SYSTEM OPERATIVELY COUPLED TO A PROCESSOR, A WORD-BASED INPUT FILE.

904 — IDENTIFYING, BY THE SYSTEM, A SET OF DATA OF A KNOWLEDGE BASE COMPRISING DOMAIN DATA INCLUDING CATEGORIES HAVING VALUES.

906 — OUTPUTTING, BY THE SYSTEM, A WORD SUBSET BASED ON THE WORD-BASED INPUT FILE.

908 — ASSIGNING, BY THE SYSTEM, A LINKING SCORE TO A WORD SUBSET AND CATEGORY PAIR BASED ON A RULES-BASED PROCESS.

910 — USING, BY THE SYSTEM, THE LINKING SCORE TO MAP THE WORD SUBSET TO THE CATEGORY.

912 — DECLUSTERING, BY THE SYSTEM, FROM A GROUP OF PAIRINGS OF THE WORD SUBSET AND CATEGORIES, INCLUDING THE CATEGORY AND A SECOND CATEGORY, A PAIRING BETWEEN THE WORD SUBSET AND THE SECOND CATEGORY, WHEREIN THE PAIRING HAS A LOWER LINKING SCORE DEFINING THE PAIRING THAN A LINKING SCORE DEFINING THE WORD SUBSET AND THE CATEGORY PAIR.

914 — ARE ALL REMAINING WORD SUBSETS FREE OF OVERLAP WITH PLURAL CATEGORIES?

NO

YES

916 — MAPPING, BY THE SYSTEM, BASED ON THE RULES-BASED PROCESS EMPLOYING SOFT MATCHING, THE WORD SUBSET TO THE CATEGORY COMPRISING A VALUE FOR BEING CORRELATED TO THE WORD SUBSET.

918 — MAPPING, BY THE SYSTEM, THE WORD SUBSET TO THE CATEGORY BASED ON AT LEAST ONE OF A HIGHEST LINKING SCORE, A DEFINED PRIORITY OR A DEFINED THRESHOLD.

920 — CORRELATING, BY THE SYSTEM, THE WORD SUBSET TO THE VALUE OF THE CATEGORY TO WHICH THE WORD SUBSET HAS BEEN MATCHED.

FIG. 9

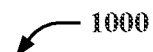
1000

COMPUTER 1001

PROCESSOR SET 1010

PROCESSING CIRCUITRY 1020     CACHE 1021

COMMUNICATION FABRIC 1011

VOLATILE MEMORY 1012

PERSISTENT STORAGE 1013

OPERATING SYSTEM 1022

SCHEMA-LINKING CODE

2000

PERIPHERAL DEVICE SET 1014

UI DEVICE SET 1023     STORAGE 1024     IoT SENSOR SET 1025

NETWORK MODULE 1015

WAN 1002

END USER DEVICE 1003

REMOTE SERVER 1004

REMOTE DATABASE 1030

PRIVATE CLOUD 1006

GATEWAY 1040

PUBLIC CLOUD 1005

CLOUD ORCHESTRATION MODULE 1041     HOST PHYSICAL MACHINE SET 1042

VIRTUAL MACHINE SET 1043     CONTAINER SET 1044

FIG. 10

RULES-BASED SCHEMA-LINKING

TECHNICAL FIELD

The present disclosure relates to preparation for transfer of a domain schema to a second domain schema, and more specifically to employing a rules-based, soft matching process for schema-linking to execute the preparation.

BACKGROUND

Data storage systems comprising large quantities of files, such as large quantities of documents, can generally use a plurality of classification, naming, labeling, terminology, semantics, synonyms and/or ontologies for defining terms, words, phrases and/or other natural language elements of such files. This differentiation can be present even in a same group, organization, firm and/or company, making it difficult for query, manipulation and/or use of data from one domain schema by a user entity accustomed to, trained in and/or defaulted to a second domain schema.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments described herein, systems, computer-implemented methods, apparatuses and/or computer program products can provide a process to provide schema-linking.

As used herein, schema-linking can refer to identifying references of columns, tables and/or condition values in natural language and/or other queries.

In accordance with an embodiment, a system can comprise a memory that stores computer executable components, and a processor that executes the computer executable components stored in the memory, wherein the computer executable components can comprise a an identification component that outputs a word subset based on a word-based input file, and a mapping component that, based on a rules-based process employing soft matching, maps the word subset to a category comprising a value for being correlated to the word subset.

As used herein, a word subset can be a gram, such as one of many ngrams.

As used herein, a word-based input file can comprise a query, question and/or request.

As used herein, a rules-based process can be one that applies rules to store, sort and/or manipulate data, such as absent use of an artificial intelligence (AI) model.

As used herein, soft matching can refer to matching that is different from hard matching. Soft matching can refer to non-exact, non-explicitly linked and non-one-to-one matching that can provide multiple results relative to a single input, such as an input word subset (e.g., gram).

An advantage of the above-indicated system can be providing for more reliable and globally accepted query response based on one or more domains that can be provided using existing frameworks, such as existing artificial intelligence model-based frameworks. That is, the above-indicated system can provide the mapping to the category based on readily available, already-in-use domain knowledge databases, which are used by various programs, applications and/or operating systems of a respective computer system. Indeed, the system can provide the mapping absent a trained dataset and absent training datasets as is the required case for use of an artificial intelligence model.

Furthermore, the system can provide the mapping to the category absent a fully defined ontology and/or absent any ontology for one or more domains of a computer system.

As used herein, a domain can refer to different sections of a computer system, whether explicitly defined or not, that are used respectively by different units, subunits, groups, parts and/or departments of a company, firm, organization and/or other group. A domain can be thought of as a combination of a central topic or theme and relevant information (e.g., category columns) from a respective knowledge database. In one or more embodiments, one or more columns can include semantic tags, slangs and/or aliases, which can be alternate ways of referring to the columns or column values.

As used herein, ontology can refer to a body of knowledge comprising a representation of naming of categories, properties and/or relations between concepts, data and data entities to substantiate and/or facilitate discourse and/or operations at a computer system. An ontology is distinguished from a domain knowledge database in that the ontology comprises instead the representations, labeling, tagging, etc. for defining relationships among aspects of a domain knowledge database. The knowledge database comprise tables and columns, with each column having one or more values associated therewith.

Another advantage of the above-indicated system can be providing for automatic return of a response to a word-based input file, such as a query, question and/or request, wherein the word-based input file can be based on and/or referring to any domain of a plurality of domains, without knowledge of a sending entity of the word-based input file relative to any one or more domains. That is, even in a case where various units and/or subunits of a company, firm, organization and/or other group use plural domains for the defining of data at a same computer system (and/or aggregated computer system) the above-indicated system can provide schema-linking as if only a single domain exists.

In one or more embodiments of the aforementioned system, the rules-based process can comprise one or more of word vector matching or fuzzy string matching. In one or more embodiments of the aforementioned system, the rules-based process can comprise plural rules-based approaches. In this way, the system can address various word attributes, such as slangs, aliases, semantic tags and/or domain rules. Likewise, the system can function absent first completing a mention detection of the word-based input file. Instead, such precise relationship between the domain knowledge database and word subsets (e.g., grams) of the word-based input file can be managed by the rules-based process of the system.

As used herein, mention detection can refer to a process of identifying mentions in a text based on relationships, such as defined by an ontology of a computer system. Put another way, mention detection can refer to a process of identifying spans of an input text, where the spans can correlate to one or more entities in a knowledge database. As used herein, such entities are referred to as categories (e.g., the columns) and values (e.g., of the columns).

In accordance with another embodiment, a computer-implemented method can comprise outputting, by a system operatively coupled to a processor, a word subset based on a word-based input file, and mapping, by the system, based on a rules-based process employing soft matching, the word subset to a category comprising a value for being correlated to the word subset.

An advantage of the above-indicated method can be providing for more reliable and globally accepted query response based on one or more domains that can be provided using existing frameworks, such as artificial intelligence model-based frameworks. That is, the method can provide the mapping to the category based on readily available, already-in-use domain knowledge databases, which are used by various programs, applications and/or operating systems of a respective computer system. Indeed, the method can provide the mapping absent a trained dataset and absent training datasets as is the required case for use of an artificial intelligence model.

Furthermore, the method can provide the mapping to the category absent a fully defined ontology and/or absent any ontology for one or more domains of a computer system.

Another advantage of the above-indicated method can be providing for automatic return of a response to a word-based input file, such as a query, question and/or request, wherein the word-based input file can be based on and/or referring to any domain of a plurality of domains, without knowledge of a sending entity of the word-based input file relative to any one or more domains. That is, even in a case where various units and/or subunits of a company, firm, organization and/or other group use plural domains for the defining of data at a same computer system (and/or aggregated computer system) the above-indicated method can provide schema-linking as if only a single domain exists.

In one or more embodiments of the aforementioned method, the rules-based process can comprise one or more of word vector matching or fuzzy string matching. In one or more embodiments of the aforementioned method, the rules-based process can comprise plural rules-based approaches. In this way, the method can address various word attributes, such as slangs, aliases, semantic tags and/or domain rules. Likewise, the method can function absent first completing a mention detection of the word-based input file. Instead, such precise relationship between the domain knowledge database and word subsets (e.g., grams) of the word-based input file can be managed by the rules-based process of the method.

In accordance with yet another embodiment, a computer program product providing a process for matching a word subset to a database entity can comprise a computer readable storage medium having program instructions embodied therewith, the program instructions executable by a processor to cause the processor to output, by the processor, a word subset based on a word-based query, and map, by the processor, based on a rules-based process employing soft matching, the word subset to a category comprising a value for being correlated to the word subset.

An advantage of the above-indicated computer program product can be providing for more reliable and globally accepted query response based on one or more domains that can be provided using existing frameworks, such as artificial intelligence model-based frameworks. That is, the computer program product can provide the mapping to the category based on readily available, already-in-use domain knowledge databases, which are used by various programs, applications and/or operating systems of a respective computer system. Indeed, the computer program product can provide the mapping absent a trained dataset and absent training datasets as is the required case for use of an artificial intelligence model.

Furthermore, the computer program product can provide the mapping to the category absent a fully defined ontology and/or absent any ontology for one or more domains of a computer system.

Another advantage of the above-indicated computer program product can be providing for automatic return of a response to a word-based input file, such as a query, question and/or request, wherein the word-based input file can be based on and/or referring to any domain of a plurality of domains, without knowledge of a sending entity of the word-based input file relative to any one or more domains. That is, even in a case where various units and/or subunits of a company, firm, organization and/or other group use plural domains for the defining of data at a same computer system (and/or aggregated computer system) the above-indicated computer program product can provide schema-linking as if only a single domain exists.

In one or more embodiments of the aforementioned computer program product, the rules-based process can comprise one or more of word vector matching or fuzzy string matching. In one or more embodiments of the aforementioned computer program product, the rules-based process can comprise plural rules-based approaches. In this way, the computer program product can address various word attributes, such as slangs, aliases, semantic tags and/or domain rules. Likewise, the computer program product can function absent first completing a mention detection of the word-based input file. Instead, such precise relationship between the domain knowledge database and word subsets (e.g., grams) of the word-based input file can be managed by the rules-based process of the computer program product.

DESCRIPTION OF THE DRAWINGS

FIG. 4 illustrates a flow diagram of a set of operations performed by the non-limiting system of FIG. 2, in accordance with one or more embodiments described herein.

FIG. 6 illustrates a flow diagram of a set of operations performed by the non-limiting system of FIG. 2, in accordance with one or more embodiments described herein.

FIG. 7 illustrates a flow diagram of a set of operations performed by the non-limiting system of FIG. 2, in accordance with one or more embodiments described herein.

FIG. 9 illustrates a flow diagram of one or more processes that can be performed by the non-limiting system of FIG. 2, in accordance with one or more embodiments described herein.

FIG. 10 illustrates a block diagram of example, non-limiting, computer environment in accordance with one or more embodiments described herein.

DETAILED DESCRIPTION

Figure 1:
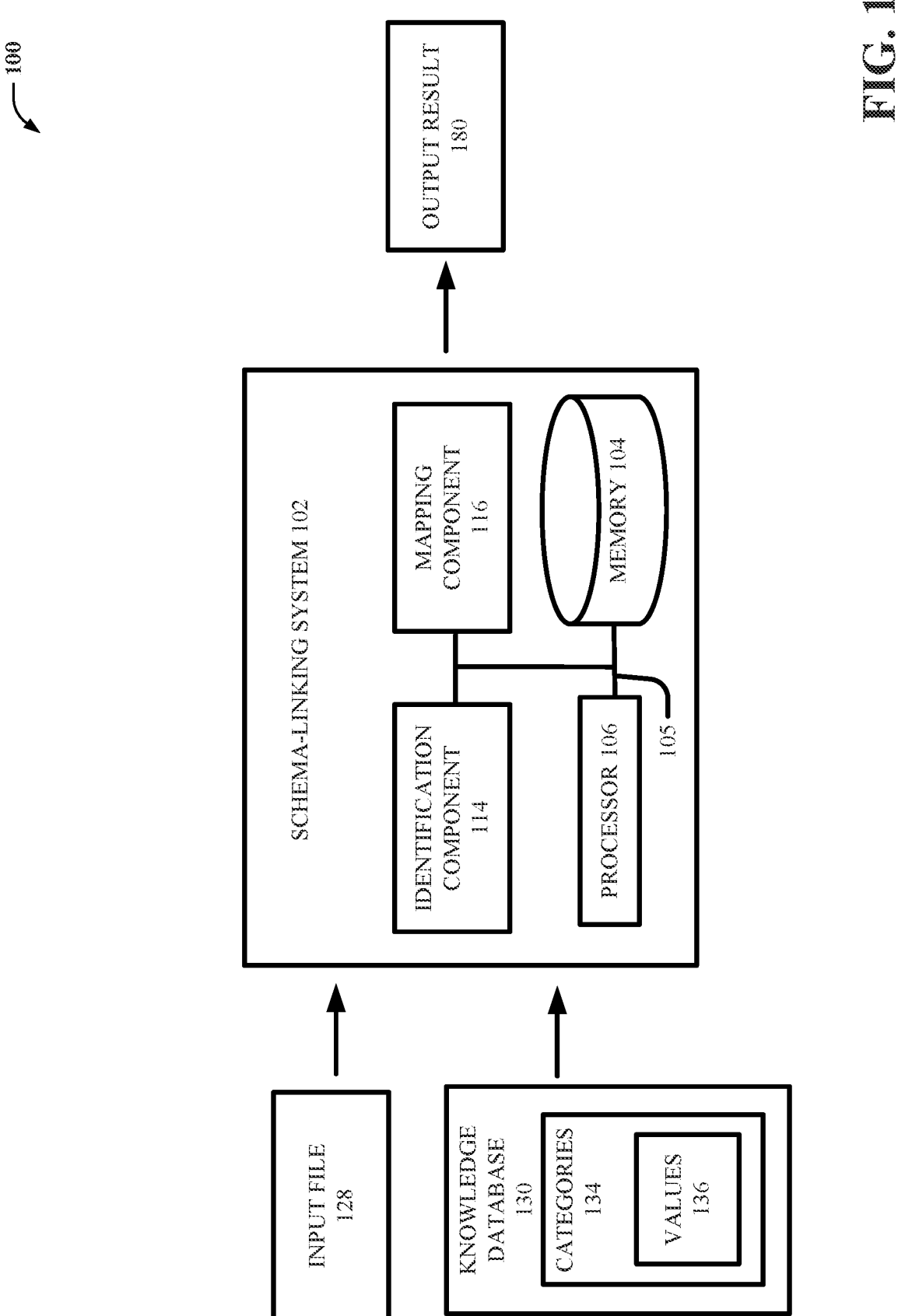
FIG. 1 illustrates a block diagram of an example, non-limiting system that can provide a process to respond to an input file, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Generally, schema-linking for providing a response to an input file, such as a query, question and/or request, can be a troublesome operation where a high-level entity (e.g., company, firm, organization, unit, group of departments, etc.) comprises one or more computer systems having various domains. These domains can be non-explicit, but can comprise data from various groups, units, subunits and/or departments of the high-level entity. Each domain can use its own ontology, or have no ontology at all, for defining relationships among database data that underlies the data on which applications, programs and/or operating systems rely. An ontology can be incomplete and thus be in-progress or lack a complete set of relationships.

Further, different domains can comprise different word attributes comprising lexical and/or semantic variations such as, but not limited to slangs and abbreviations, aliases, dual names (e.g., dual values), synonyms, semantic tags, never-before-seen words and/or concepts and/or domain rules.

These domains can comprise, for example, finance, sales, marketing, engineering, manufacturing, advertising, research and development, quality control, shipping, receiving, etc. The data of a domain knowledge base can comprise, for example, revenues, earnings, personnel, capital, expenditures, quality tallies, marketing polling data, etc. Thus, an entity from and/or related to one domain can desire to answer a query that can be based on and/or related to one or more domains for which the entity does not have knowledge and/or for which the entity does not know the ontology to accurately construct an effective query.

For example, an entity from company A (CPA) in the software department can desire to answer the following query: "What business unit has revenue higher than CPA software.?" Accordingly, an effective query and receipt of response can require understanding of an ontology or word attributes of multiple domains. It can be difficult or impossible for such entity to search domains other than software due to different domains having different ontologies and/or word attributes. Indeed, even the term "revenue" can be used differently or referred to differently (e.g., as "profits") in one or more other domains. That is, absent global knowledge and understanding of all knowledge base data for different domains, such query process can fail at the outset.

To query and/or search such a domain in existing frameworks, an analytical model such as an artificial intelligence model, such as a machine learning or deep learning model, can be employed. However, this can be difficult where sufficient data is not available to train the model or generate a training dataset, a training dataset has not yet been manually generated, an entity training the model does not have full knowledge or access to one or more domains, an ontology is incomplete and/or a knowledge database is not well-aligned to an existing ontology.

Further, such model can be time-consuming and manual-labor intensive due to being entity-curated and often having subjective output.

As a consequence, in existing frameworks, a returned result to a query can be incomplete, have an error, be incorrect and/or require generation and training of an analytical model.

To account for one or more of these deficiencies of existing frameworks, one or more embodiments are described herein that differently can respond to a query through a rules-based process using soft matching, with minimal or no labeled training data, without use of an analytical model, without extensive manual labor, and/or even without up-front mention detection. That is, even in a case where multiple domains exist and/or multiple ontologies are fragmented or non-existent, the one or more frameworks described herein can provide a response to the query. This can be the case even where the query is not worded and/or constructed to be well-aligned to one or more domains comprising categories and/or values for use in answering the query. This can be the case even where mention detections are not provided for each and every domain of a data and/or computer system.

Generally, embodiments described herein can employ one or multiple linking mechanisms, such as fuzzy string match and/or word vector similarity to evaluate and return a response for a query with a bare minimum set of resources, such as only column names and values in a domain knowledge database. As mentioned above, such domain knowledge database can be a base database underlying and/or which is used by programs, applications and/or operations systems at a computer system.

As used herein, fuzzy string matching can refer to a technique of finding strings that match with a given string partially and/or not exactly (e.g., not explicitly). Fuzzy string matching can be employed to detect alternate spellings of words or spelling errors.

As used herein, word vector similarity can refer to mapping of words to vectors of real numbers that can reflect the words' semantic similarity. Word vector similarity can be employed to detect synonyms such as by providing a high similarity when two strings convey same information but are worded differently.

The embodiments described herein can manage lexical and semantic variations found in natural language while being less dependent on manually generated synonym set and ontologies. Instead, a rule-based process of the embodiments described herein can employ the soft matting absent having first completed mention detection of a query, and thus is not limited by non-existence and/or poor performance of mention detectors and semantic parsers, as is the case in existing frameworks.

Further, in view of the rule-based process, in lieu of an analytical model such as an AI model, output results of the embodiments described herein can be explained with reasoning able to be described and/or illustrated, allowing for trust of the embodiments described herein by user entities.

The schema-linking that can be provided by the embodiments described herein can employ one or more operations including, but not limited to: identifying word subsets of an input file, for each word subset using one or more soft matching processes to attempt to match each word subset with each data column of a already-in-place knowledge database (e.g., underlying domain knowledge database), for each match generated calculating a linking score defining a strength of the match, comparing the linking scores, and declustering the matches based on the linking scores to return only a single match for each word subset to a single column.

The score calculation can employ dot product operation and/or cosine similarity operation, among other processes.

The declustering can comprise use of one or more thresholds to filter out low linking scores, selection of highest linking scores for each subset and/or use of defined priorities for one or more columns to output the final set of output results.

As used herein, the term "cost" can refer to money, power, memory, bandwidth, time and/or manual labor.

As used herein, the terms "entity," "requesting entity," and "user entity" can refer to a machine, device, component, hardware, software, smart device and/or human.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100 and/or 200 illustrated at FIGS. 1 and 2, and/or systems thereof, can further comprise one or more computer and/or computing-based elements described herein with reference to a computing environment, such as the computing environment 1000 illustrated at FIG. 10. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning now in particular to one or more figures, and first to FIG. 1, the figure illustrates a block diagram of an example, non-limiting system 100 that can facilitate a process for matching a word subset to a database entity, in accordance with one or more embodiments described herein.

The non-limiting system 100 can comprise a schema-linking system 102, which can be associated with a cloud computing environment. The schema-linking system 102 can comprise one or more components, such as a memory 104, processor 106, bus 105, identification component 114 and/or evaluation component 116. Generally, schema-linking system 102, and thus non-limiting system 100, can facilitate evaluation of an input file 128 to schema-link one or more word subsets of the input file 128 with one or more categories 134 of a domain knowledge database 130. Each category 134 can have associated therewith one or more values 136, such as numerical values. The data of the knowledge database 130 can be provided in any suitable format.

That is, the schema-linking system 102 can provide the mapping to the category 134 based on a readily available, already-in-use domain knowledge database 130, which is already used by various programs, applications and/or operating systems of a respective computer system. The computer system can comprise the schema-linking system 102 or be separate therefrom. Indeed, the schema-linking system 102 can provide the mapping absent a trained dataset and absent training datasets as is the alternative case for use of an artificial intelligence model. Furthermore, the schema-linking system 102 can provide the mapping to the category 134 absent a fully defined ontology and/or absent any ontology for one or more domains of the computer system.

The identification component 114 can output a word subset based on a word-based input file 128. The word subset can be referred to as a gram or as an ngram of a plurality of n-number grams. That is, the identification component 114 can tokenize the input file 128 into a plurality of word subsets, thereby having tokenized all words of the word-based input file 128 into word subsets. Each word subset can comprise one or more words. Plural word subsets can comprise the same word.

The evaluation component 116 can, based on a rules-based process employing soft matching, map the word subset to a category 134 comprising a value 136 for being correlated to the word subset. That is, the category 134 can be defined as a unit of the domain knowledge data base 130, such as a column, where the values 136 can be specific instances of data of the category, such as numerical instances. As indicated above, a rules-based process can comprise a process that applies rules to store, sort and/or manipulate data, such as absent use of an artificial intelligence (AI) model. As used herein, soft matching can refer to matching that is different from hard matching. Soft matching can refer to non-exact, non-explicitly linked and non-one-to-one matching that can provide multiple results relative to a single input, such as an input word subset (e.g., gram).

Figure 2:
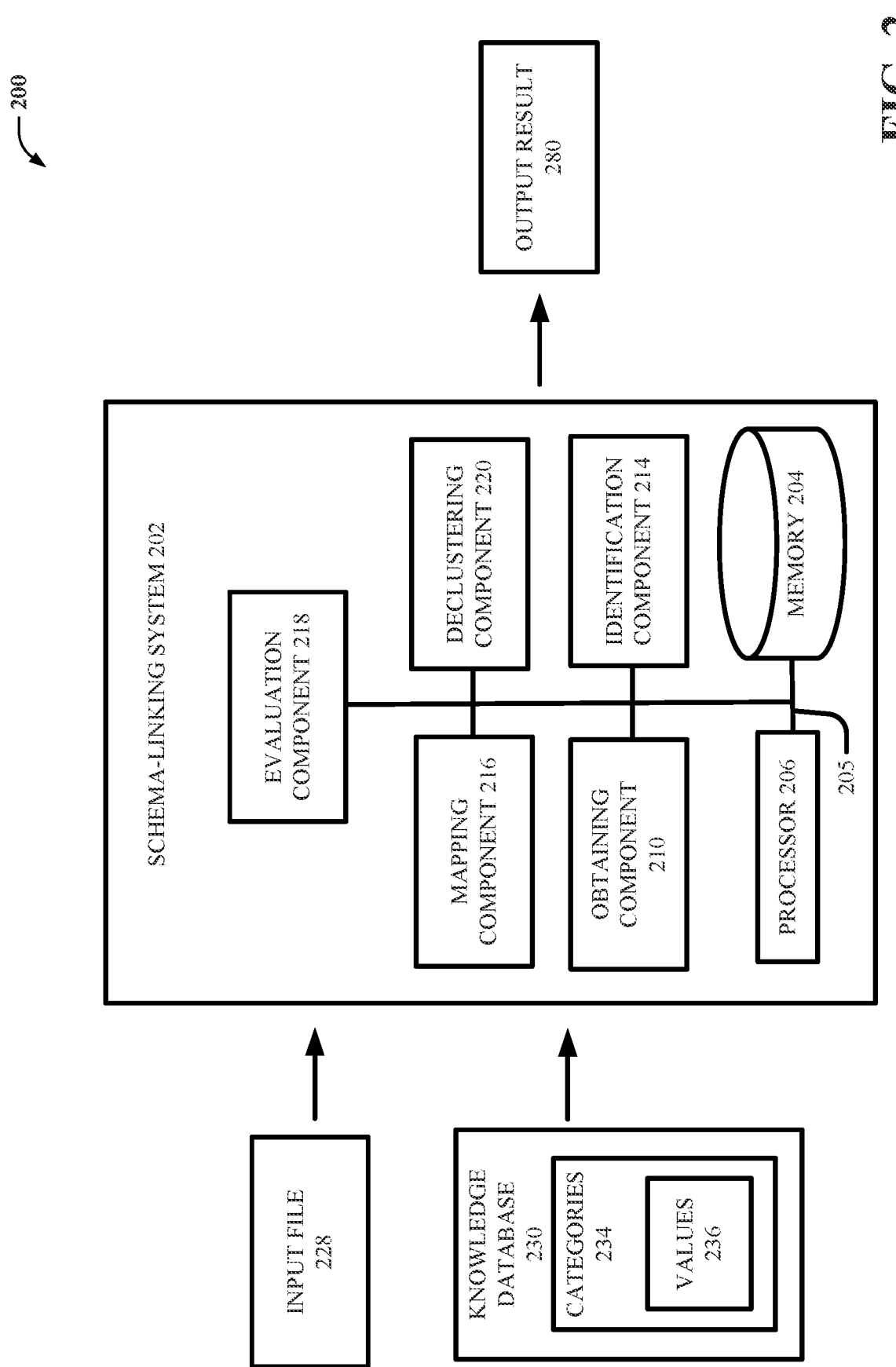
FIG. 2 illustrates a block diagram of another example, non-limiting system that can provide a process to respond to an input file based on public repository data, in accordance with one or more embodiments described herein.

Turning next to FIG. 2, a non-limiting system 200 is illustrated that can comprise a schema-linking system 202. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The schema-linking system 202 can be associated with, such as accessible via, a cloud computing environment.

The schema-linking system 202 can comprise a plurality of components. The components can comprise a memory 204, processor 206, bus 205, obtaining component 210, identification component 214, evaluation component 218, declustering component 220 and/or evaluation component 218.

Generally, schema-linking system 202, and thus non-limiting system 200, can facilitate evaluation of an input file 228 to schema-link one or more word subsets of the input file 228 with one or more categories 234 of a domain knowledge database 230.

That is, the schema-linking system 202 can provide the mapping to the category 234 based on a readily available, already-in-use domain knowledge database 230, which is already used by various programs, applications and/or operating systems of a respective computer system. The computer system can comprise the schema-linking system 202 or be separate therefrom. Indeed, the schema-linking system 202 can provide the mapping absent a trained dataset and absent training datasets as is the alternative case for use of an artificial intelligence model. Furthermore, the schema-linking system 202 can provide the mapping to the category 234 absent a fully defined ontology and/or absent any ontology for one or more domains of the computer system.

Discussion first turns briefly to the processor 206, memory 204 and bus 205 of the schema-linking system 202. For example, in one or more embodiments, the schema-linking system 202 can comprise the processor 206 (e.g., computer processing unit, microprocessor, classical processor, quantum processor and/or like processor). In one or more embodiments, a component associated with schema-linking system 202, as described herein with or without reference to the one or more figures of the one or more embodiments, can comprise one or more computer and/or machine readable, writable and/or executable components and/or instructions that can be executed by processor 206 to provide performance of one or more processes defined by such component and/or instruction. In one or more embodiments, the processor 206 can comprise the obtaining component 210, identification component 214, evaluation component 218, declustering component 220 and/or evaluation component 218.

In one or more embodiments, the schema-linking system 202 can comprise the computer-readable memory 204 that can be operably connected to the processor 206. The memory 204 can store computer-executable instructions that, upon execution by the processor 206, can cause the processor 206 and/or one or more other components of the schema-linking system 202 (e.g., obtaining component 210, identification component 214, evaluation component 218, declustering component 220 and/or evaluation component 218) to perform one or more actions. In one or more embodiments, the memory 204 can store computer-executable components (e.g., obtaining component 210, identification component 214, evaluation component 218, declustering component 220 and/or evaluation component 218).

The schema-linking system 202 and/or a component thereof as described herein, can be communicatively, electrically, operatively, optically and/or otherwise coupled to one another via a bus 205. Bus 205 can comprise one or more of a memory bus, memory controller, peripheral bus, external bus, local bus, quantum bus and/or another type of bus that can employ one or more bus architectures. One or more of these examples of bus 205 can be employed.

In one or more embodiments, the schema-linking system 202 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the schema-linking system 202 and/or of the non-limiting system 200 can reside in the cloud, and/or can reside locally in a local computing environment (e.g., at a specified location).

In addition to the processor 206 and/or memory 204 described above, the schema-linking system 202 can comprise one or more computer and/or machine readable, writable and/or executable components and/or instructions that, when executed by processor 206, can provide performance of one or more operations defined by such component and/or instruction.

Turning now to the additional components of the schema-linking system 202 (e.g., obtaining component 210, identification component 214, evaluation component 218, declustering component 220 and/or evaluation component 218), generally, the schema-linking system 202 can facilitate a process for matching a word subset to a database entity, such as of a computer-based system.

Figure 3:
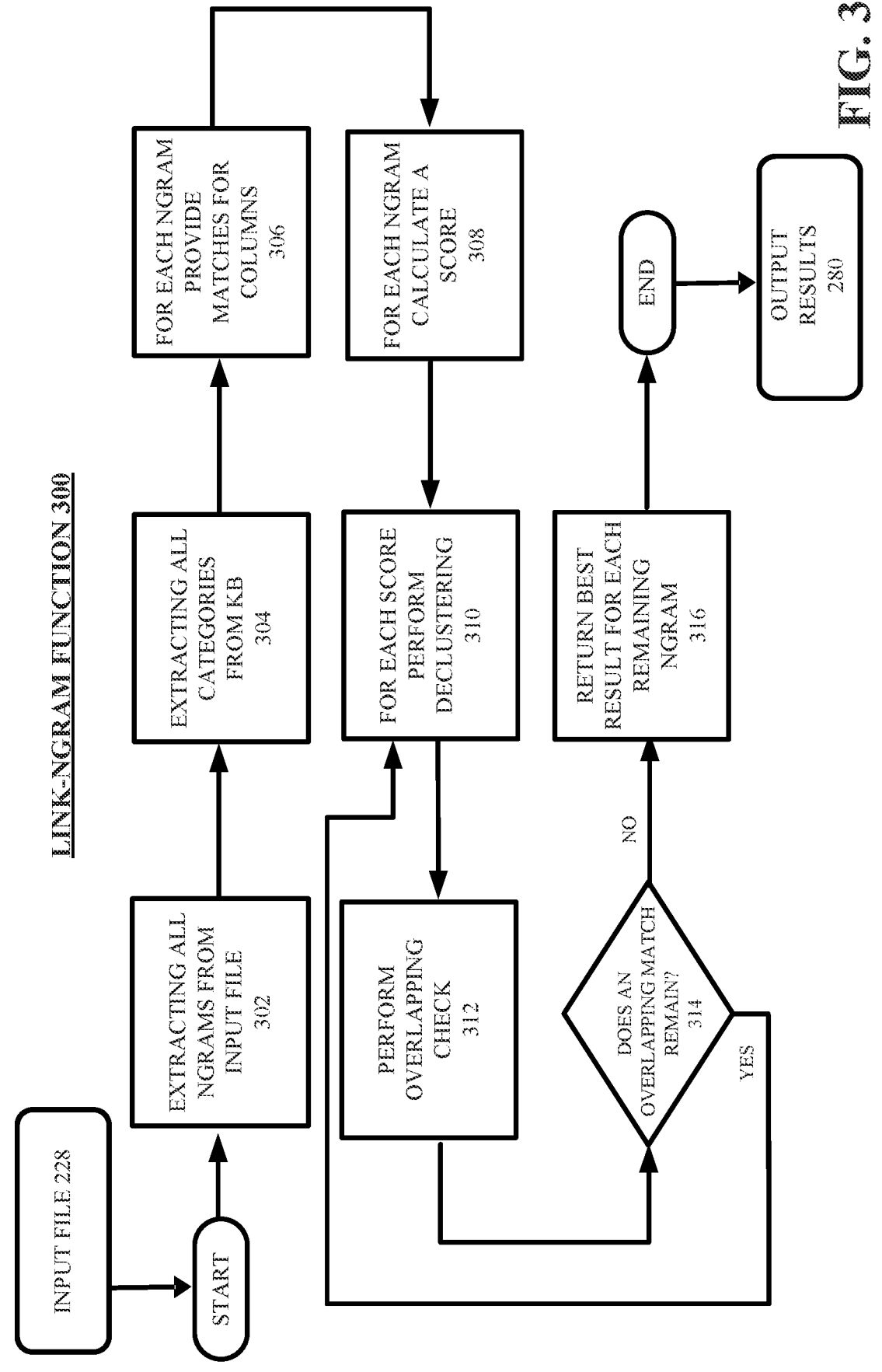
FIG. 3 illustrates a flow diagram of a high-level set of operations performed by the non-limiting system of FIG. 2, in accordance with one or more embodiments described herein.

Description turns first to FIG. 3 to set forth a general layout 300 of one or more steps comprised by the rules-based process performed by the schema-linking system 202. That is, FIG. 3 provides a high-level set of operations that will be further explained relative to the illustrations of FIGS. 2 and 5-8.

As illustrated, at step 302, based on the input file 228, the input file 228 can be tokenized into ngrams, as already described by the identification component 214. At step 304, based on the knowledge database 230, the identification component 214 can extract the categories 234. The evaluation component 218 can perform step 306, where for each ngram, one or more matches are provided for columns of the categories 234. The evaluation component 218 can calculate a linking score at step 308 to allow for organizing and declustering of the matches. The declustering can be performed at step 310 by the declustering component 220. The declustering component 220 also can perform an overlapping check at step 312 to determine (step 314) whether any ngrams remain having more than one match to more than one categories 234. Where the answer is yes, the rules-based process can return to declustering step 310. Where the answer is no, the rules-based process can finalize by returning only the single best result for each remaining ngram at step 316. These results can be defined as the output results 280.

Description now turns to particular functions of these components of the schema-linking system 202, e.g., the obtaining component 210, identification component 214, evaluation component 218, declustering component 220 and/or evaluation component 218.

Turning first to the obtaining component 210 and to FIG. 4 in combination with FIG. 2, the obtaining component 210 can identify, search, receive, transfer and/or otherwise obtain the input file 228 and the knowledge database 230. The knowledge database 230 can comprise data and/or metadata in any suitable format. The knowledge database 230 can comprise data from any one or more domains of a single and/or aggregated computer system and/or other electronic and/or digital system. As indicated above, the data is already-in-use by applications, programs and/or operating systems of the single and/or aggregated computer system. The data can comprise categories 234 of data. Each category 234 can have associated therewith one or more values 236, such as numerical values. The value 236 can comprise one or more words or numerical values that can relate to a word subset that is to be matched to a category 234 by the schema-linking system 202.

The knowledge database 230 and/or the input file 228 can be accessed by any suitable method, such as a local network, internet and/or cloud. Likewise, the obtaining of the knowledge database 230 and/or the input file 228 can comprise any suitable communication (e.g., as described above) over any local network, open-source network, wide area network and/or cloud. The obtaining can comprise extracting of data, tracing of data trees, read requests, etc.

The input file 228 can comprise data and/or metadata in any suitable format. Exemplary input files 228 can comprise one or more digital and/or digitized documents, queries, informative sources, tables, lists, code sets and/or matrices. The obtaining of the input file 228 can comprise receipt of a request or input of the input file 228, such as by a user entity, to the schema-linking system 202.

Referring still to FIG. 4, as generally set forth above relative to initial description of FIG. 2, the natural language interface to database (NLIDB) process 400 can comprise employing schema linking 404 (e.g., by the identification component 214 and evaluation component 218) to match word subsets, such as ngrams 403, of the input file 228 with predicted columns 406 of the columns 234 of the database 230.

First, the identification component 214 can output at least one word subset based on the word-based input file 228. That is, the identification component 214 can evaluate the input file 228, such as a query, and tokenize (e.g., break up) the input file 228 into word subsets. The tokenizing can comprise including each word of the input file 228 into one or more word subsets, such that all of the words of the input file 228 will be tokenized. As noted above, these word subsets can be defined as grams, such as output ngrams 403 of a set of n grams.

Accordingly, the input file 228 can be tokenized into plural word subsets. For example, looking to the query 228 at FIG. 4, the query "What is the revenue distribution by Region A market?" can be broken into word subsets of "What is the," "revenue," "distribution," "Region A" and "market." Three of the word subsets are circled to provide illustration without cluttering.

Further, multiple word subsets can comprise a same word of the input file 228. For example, looking to the query 228 at FIG. 4, the query "What is the revenue distribution by Region A market?" can be broken into word subsets of "What is," "is the revenue," "revenue distribution," "Region A" and "market." Note that both "revenue" and "is" are tokenized into multiple word subsets (e.g., two word subsets each).

Next, referring still to FIG. 4, the mapping component 216 can employ the output ngrams 403 and the data of the knowledge database 230 (e.g., the categories 234) and can generally utilize a rules-based process comprising soft matching to match the ngrams 403 to the categories 234. As illustrated, finalized matches for the circled ngrams 403 of "revenue," "distribution" and "REGION A" can comprise the illustrated predicted columns 406 of fact revenue cost expense and revenue plan amount for "revenue". Matches can comprise predicted columns 406 of dim geography and geography name for "REGION A." Matches can comprise predicted columns 406 of dim geography and market name for "market." Further, the ngram "NIL" can refer to there being no span of text that corresponds to the [DIM_TIME-_PERIOD].[YEAR] column, but that the column is part of the output result 280 due to an output rule or domain-specific rule. For example, the rule can indicate that the current year is to be used if a year is not explicitly indicated in the input file 228.

Figure 5:
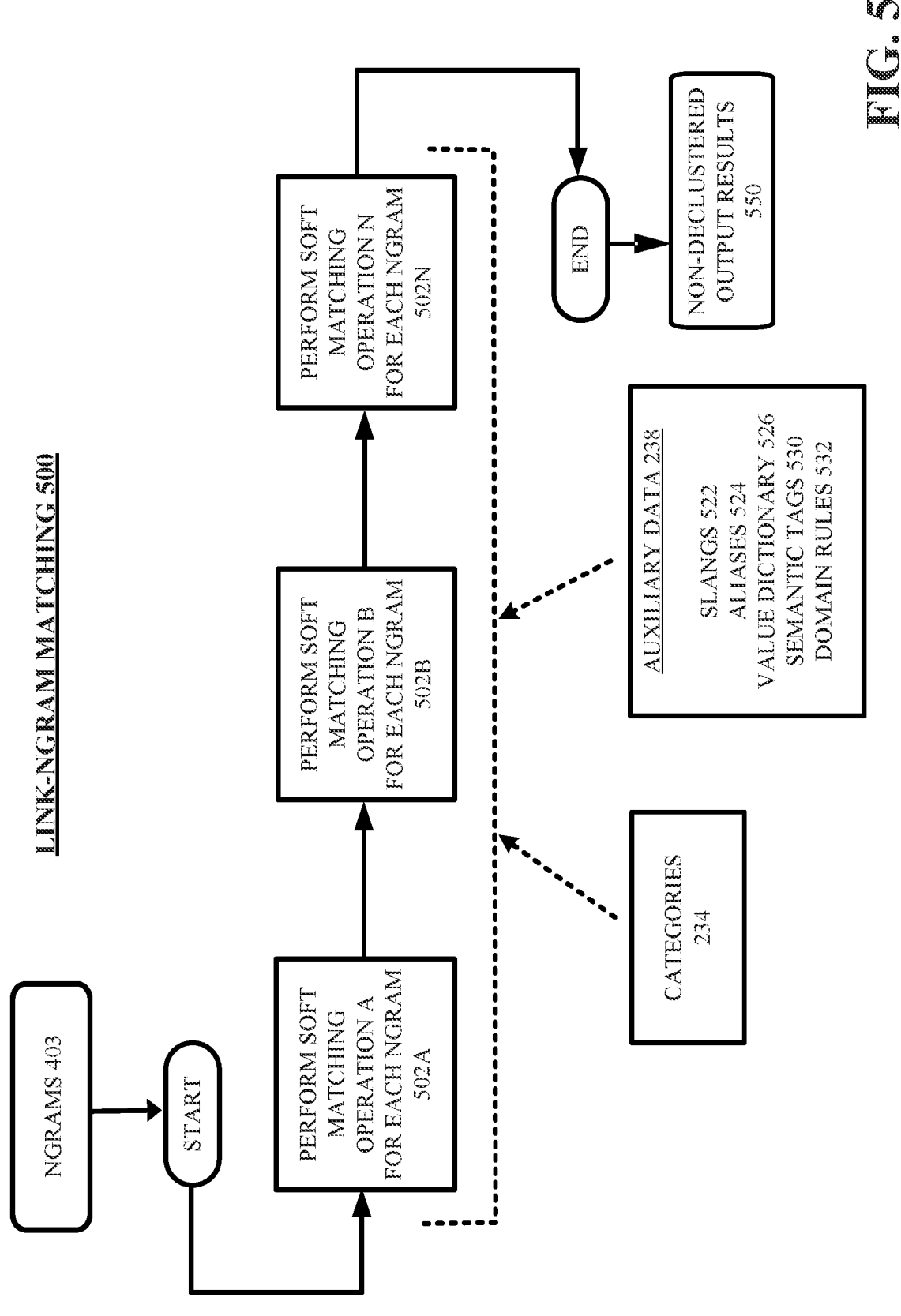
FIG. 5 illustrates a flow diagram of a set of operations performed by the non-limiting system of FIG. 2, in accordance with one or more embodiments described herein.

Referring still to the mapping component 216 and now to the high-level matching process 500 of FIG. 5, the mapping component 216 can generally, based on a rules-based process employing soft matching to map the ngrams 403 to categories 234. As illustrated at FIG. 5, this rules-based process can generally comprise performing at least one soft matching operation based on at least one soft matching scheme for each ngram 403. Further, the rules-based process can comprise performing multiple soft matching operations based on different soft matching schemes, for each ngram 403.

For example, each ngram 403 can be analyzed by a first soft matching operation A at step 502A, then analyzed by a second soft matching operation B at step 502B, and then further analyzed by an Nth soft matching operation at step 502N. Inputs to these soft matching operations A, B N can comprise the categories 234, in addition to auxiliary data 238 comprising one or more word attributes. These word attributes can comprise one or more slangs 522, aliases 524, value dictionary 526, semantic tags 530 and/or domain rules 532. Further detail regarding this soft matching and use of the word attributes will be provided below, relative to FIG. 6.

An output of the matching by the mapping component 216 can be a noisy group of non-declustered output results 550. That is, the noisy group can comprise a plurality of matches of ngrams 403 to categories 234. Each ngram 403 can be matched to multiple categories 234, as illustrated and explained for ngams 403 of "revenue," "REGION A" and "market" relative to FIG. 4. Accordingly, the matches can overlap. In one or more other embodiments, multiple ngrams 403 can comprise the same word. Accordingly, the ngrams themselves can overlap.

Yet, to provide usable results to the user of the schema-linking system 202, a single match for each ngram 403 to a single category 234 is to be output as the output results 280 to the user entity. Further, non-overlapping ngrams 403 should be returned as the output results 280. Accordingly, the output results 280 can comprise a group of ngrams, with each ngram matched to one category, and with each word of the input file 228 being comprised by only one ngram. It is noted that multiple ngrams can be matched to a same column/category. Thus, as will be described below, these non-declustered output results 550 will be scored by the evaluation component 218 and declustered by the declustering component 220.

But first, further description is provided describing how the soft matching is performed by the mapping component 216, first relative to an Example Process A, and then relative to FIG. 6.

Example Process A provides a list of steps of a link-ngram function (e.g., of and/or employed by the mapping component 216) that can apply the rules-based process and the soft matching to output the non-declustered output results 550. The link-ngram function can comprise one or more algorithmic steps for which data can be stored at any suitable location, such as the knowledge database 230 or memory 204.

Exemplary steps of one embodiment of a link-ngram function are illustrated below at Example Process A for an ngram of "revenue". It is noted that the Example Process A can be repeated a plurality of times for all ngrams identified from the respective input file 228 by the identification component 214.

Example Process A:

```
Link_ngram (ngram, list_of_columns):
    """"""
    ngram="revenue"
    list_of_columns=["revenue", "expense", "customers", . .
        . all columns in DB]
    """"""
    best_matching column=None
    best_score=−1
    for column_name in list_of_columns:
        s1=vector_similarity(ngram, column_name)
        s2=fuzzy_string_match(ngram, values in column or
            column_name)
        . . .
        sn=some_other_method(ngram, column_name or val-
            ues)
        score=max(s1, s2, sn)
        if score>best_score:
            best_matching_column=column_name
    return best_matching_column, best_score
```

As indicated, the soft matching performed by the matching component can comprise one or more soft matching methods, such as, but not limited to vector similarity and fuzzy string matching.

As noted above, fuzzy string matching can refer to a technique of finding strings that match with a given string partially and/or not exactly (e.g., not explicitly). Fuzzy string matching can be employed to detect alternate spellings of words or spelling errors.

For example, the ngram "system hardware" and the column value "Systems Hardware" can match with a high score. It is noted that a match of an ngram to a column can comprise a match of the ngram to a value of the column, and thus also be a match of the ngram to the column comprising the value.

Also as noted above, word vector similarity can refer to mapping of words to vectors of real numbers that can reflect the words' semantic similarity. Word vector similarity can be employed to detect synonyms such as by providing a high similarity when two strings convey same information but are worded differently.

For example, the ngram "revenue" and the column "[FACT_REVENUE_COST_EXPENSE].[REVENUE_ PLAN_AMOUNT]" can be matched with a high score.

Further as indicated, the soft matching does not necessitate use of or training of an analytical model (e.g., AI model), use of an AI training dataset and/or domain ontology. Although, in one or more embodiments, a domain ontology can be employed, if available.

As illustrated at FIG. 6, a link-ngram function can further employ one or more word attributes, such as slangs 522, aliases, 524, value dictionary 526, semantic tags 530 and/or domain rules 532 to match an ngram to a column directly and/or to a column by matching to a column value (e.g., a value comprised by a column, thus matching to the column indirectly).

First, the input file 228, as illustrated, can be tokenized into ngrams 403 at step 622. At steps 624 and 626, fuzzy string match can be employed for each ngram 403 as compared to each column of the categories 234.

At step 624, domain slang 522 can be employed to link one or more ngrams to one or more columns. Slang 522 can refer to abbreviations such as "geo" for "geography" or dual names for words, such as departments of an organization.

At step 626, the fuzzy string matching can employ one or more aliases 524 to link one or more ngrams to one or more columns. An alias 524 can refer to a short-term name or organization-based term, such as "CPB" for the name of "Company B."

Also at step 626, the fuzzy string matching can employ a value dictionary 526. The value dictionary can comprise a mapping between a column value and the list of all columns where this value is present. For example, a value/string Japan can be found in two columns of GEOGRAPHY_ NAME and MARKET_NAME. The value CPA can be found in the column DUAL_UNIT_NAME. Accordingly, by fuzzy string matching, ngram "Japan" can be linked (e.g., matched) to either GEOGRAPHY_NAME or MARKET_ NAME.

As shown, step 626 further can employ one or more column precedence rules 628. That is, a column precedence rule can exact that column GEOGRAPHY_NAME should be given priority and thus the mapping component 216 can map Japan to GEOGRAPHY_NAME.

At step 630, word vector similarity can be employed to further link one or more ngrams to one or more columns. It is noted that these ngrams can have been already linked one or more times using fuzzy string matching at step 624 and/or step 626. Further, it is noted that any of steps 624, 626 and 630 can be completed in any suitable order and/or can be completed at least partially in parallel with one another.

The word vector similarity at step 630 can comprise use of one or more semantic tags 530. A semantic tag 530 can refer to names that are used in common speech and/or writing, but refer to much larger word subsets, phrases, terms in a respective domain database. Examples can include "customer" for "GLOBAL_BUYING_GROUP_N- AME_CURRENT" or "Revenue" for "REVENUE_ PLAN_AMOUNT."

As illustrated at FIG. 6, each of the steps 624, 626 and 630 can be performed for each ngram.

At step 631, the declustering component 220 can manage overlapping matches and/or overlapping ngrams, meaning that declustering of the noisy data output from the soft matching can be filtered. This process will be further described relative to the declustering component 220 and FIGS. 7 and 8, below.

At step 632, one or more domain specific rules 532 can be employed by the mapping component 216 to provide further information for the output results 280. For example, in addition to outputting a single category match for a word subset of the input file 228, additional terms can be added to the output results 280, such as a current year.

Briefly turning again to FIG. 4, the matching generation and execution module 420 can facilitate calculation of scoring of these matches and then filtering/declustering of these matches to output the output result 280. The matching generation and execution module 420 can comprise and/or be comprised by the evaluation component 218 and declustering component 220 (FIG. 2).

Referring next to the evaluation component 218, this component can assign a linking score to each ngram/category match of the non-declustered output results 550. These linking scores can be employed by the mapping component 216 to perform a final output of the schema-linking system 202 as the output results 280. Briefly, the linking scores can be any suitable numerical score, such as between 0 and 1, between 0 and 10 and/or using any other range. The linking scores can employ whole numbers and/or numbers between whole numbers. The linking scores can be assigned using one or more processes such as dot product operation and/or cosine similarity operation. Each linking score is assigned between one gram 403 and one category 234 (e.g., one column). An output of the evaluation component 218 is thus still a noisy plurality of ngram/category matches, but with the addition of the ngram/category matches each having associated therewith a linking score. The linking scores can be stored in any suitable format (e.g., list, matrix and/or table) at any suitable location (e.g., knowledge database 230, memory 204, etc.)

Figure 8:
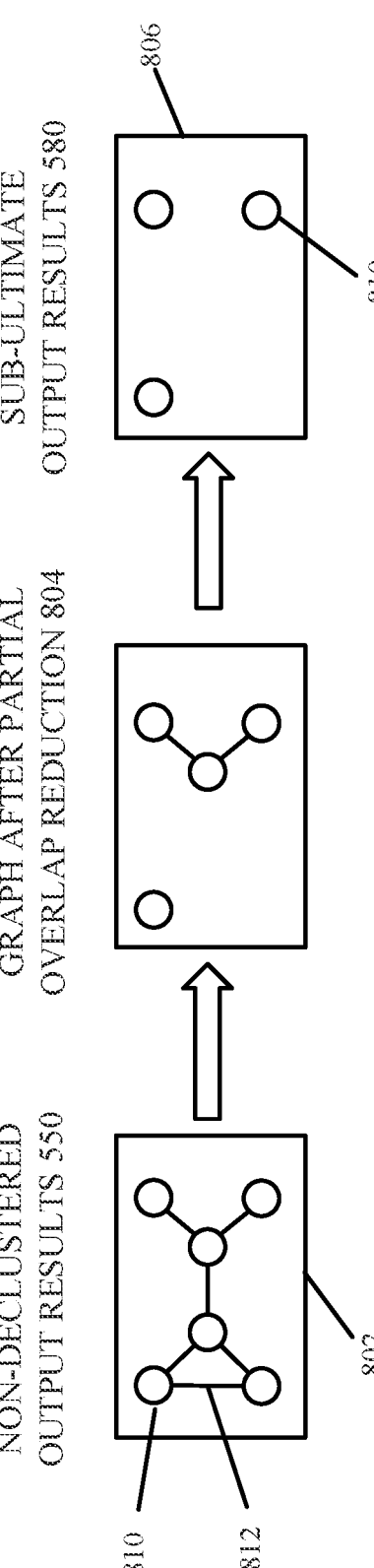
FIG. 8 illustrates a flow diagram of a set of operations performed by the non-limiting system of FIG. 2, in accordance with one or more embodiments described herein.

Turning now to FIGS. 7 and 8 and the declustering component 220, the declustering component can generally filter the non-declustered output results 550 into the sub-ultimate output results 580 comprising only single matches of a single category 234 for each ngram 403 that is remaining. That is, one or more ngram-category matches can be removed by the declustering component 220, which removal can comprise removing one or more ngrams fully from the non-declustered output results 550 (that are being declustered by the declustering component 220).

As indicated above, each ngram 403 can be matched to multiple categories 234, as illustrated and explained for ngams 403 of "revenue," "REGION A" and "market" relative to FIG. 4. Accordingly, the matches can overlap. In one or more other embodiments, multiple ngrams 403 can comprise the same word. Accordingly, the ngrams themselves can overlap.

Generally, as illustrated at FIG. 7 relative to the declustering process 700, the declustering component 220 can perform one or more of a plurality of steps comprising thresholding, overlap reduction and/or evaluation of one or more category priorities.

For example, at step 702, the declustering component 220 can obtain a threshold from any suitable storage location. Such threshold can place a limit on the values of the linking scores that can satisfy such threshold. Such threshold can be default and/or applied by an administrating entity of the schema-linking system 202.

At step 704, thresholding can be performed, based on the thresholds obtained from step 702. For example, relative to linking scores of a range of 0 to 1, linking scores less than or equal to 0.2 can fail to satisfy a threshold.

At step 706, one or more ngrams and/or matches can be removed from the set of matches being evaluated by the declustering component 220. For example, ngram/column matches having linking scores less than or equal to 0.2 can be removed from the noisy set of matches, thus reducing the noisiness and quantity of matches. In this way, one or more ngrams can be fully removed from the set of matches being evaluated. As an example, relative to FIG. 4 and the input file 228, ngrams 403 for "What is the" can have low linking scores, and thus be removed. In existing frameworks, such step can be performed during pre-matching mention detection. However, as explained above, such mention detection can require databases and/or ontologies that simply are not always accessible, available and/or existent, and thus a benefit of the one or more embodiments described herein is that such pre-matching mention detection is not performed. Rather mention detection can be folded into the rules-based processes of the schema-linking system 202.

At step 708, the declustering component 220 can determine whether any ngrams are associated with a linking score that does not satisfy a threshold, such as being below a threshold. Where the answer is yes, the declustering process 700 can return to step 704. Where the answer is no, the declustering process 700 can continue to step 710.

At step 710, overlap reduction can be performed by the declustering component 220. For example, the declustering component 220 can compare linking scores related to each ngram to one another. That is, for a first ngram, the declustering component 220 can compare all linking scores associated with that first ngram. For a second ngram, the declustering component 220 can compare all linking scores associated with that second ngram. For an nth ngram, the declustering component 220 can compare all linking scores associated with that nth ngram.

Only the highest linking scores can be retained, and thus matches associated with the non-highest linking scores can be removed. Additionally and/or alternatively, a first ngram sharing a word with a second ngram can be removed where the second ngram has a higher linking score associated therewith than the first ngram has associated therewith. This process can completely remove one or more columns/categories from the list of matches being evaluated by the declustering component 220. This process can completely remove one or more ngrams from the list of matches being evaluated by the declustering component 220.

In one or more embodiments, the declustering component 220 can remove, from a group of pairings of a word subset and categories, including a first category and a second category, a pairing between the word subset and a second category, wherein the pairing has a lower linking score defining the pairing than a linking score defining the word subset and the first category pair.

In a case where two matches or two ngrams have same linking scores, one or more precedence rules and/or domain rules can be employed to break such tie. For example, one category can have precedence over other categories.

In one or more embodiments, the declustering process 700 can further comprise use of one or more domain priorities, such as based on one or more domain rules 532. For example, one or more domains and/or categories can be provided priority over one or more other domains and/or categories. For example, priority can be over all other categories of a domain, or only over selected categories of a domain. This process can be employed whether or not there is a linking score tie.

At step 712, the declustering component 220 can determine whether there remains one or more overlapping matches for an ngram (e.g., multiple categories/columns matched to one ngram) or overlapping ngrams (e.g., multiple ngrams matched to a same category/column). In one or more cases, however, multiple remaining ngrams still can match to a same category/column. (See, e.g., FIG. 4, where both "REGION A" and "market" can match to "DIM GEOGRAPHY". Where the answer is yes, the declustering process 700 can return to step 710 for additional overlap reduction. Where the answer is no, the declustering process 700 can end, outputting the sub-ultimate output results 580.

It is noted that the sub-ultimate output results 580 are not necessarily the output results 280, as the mapping component 216 can perform one or more additional processes and/or can merely output the sub-ultimate output results 580 as the output results 280. In one or more other embodiments, the declustering component 220 can merely output the sub-ultimate output results 580 as the output results 280, such as at the direction of the mapping component 216.

Where the mapping component 216 performs one or more additional processes, these one or more additional processes can comprise additional thresholding and/or prioritizing. For example, in one or more embodiments, the mapping component 216 can employ use of one or more additional thresholds that can further remove non-overlapping matchings. In one or more additional and/or alternative embodiments, the mapping component 216 can employ use of one or more domain priorities, such as based on one or more domain rules 532. In one or more embodiments, the mapping component 216 can direct the declustering component 220 to employ the domain priorities explained above.

Looking briefly to FIG. 8 and the declustering diagram 800, the diagram portion 802 can represent the overlapping (e.g., overlapping matches and overlapping ngrams) of the non-declustered output results 550. The diagram portion 803 can illustrate the remaining matches 810 and overlaps 812 that can remain after thresholding to remove overlapping matches. At the diagram portion 803, it can be seen that three ngrams still can overlap (e.g., having one or more same words). The diagram portion 806 can illustrate the result of complete non-overlapping ngrams and matches after thresholding to remove overlapping ngrams.

Referring next to FIG. 9, illustrated is a flow diagram of an example, non-limiting method 900 that can provide a process for matching a word subset to a database entity, in accordance with one or more embodiments described herein, such as the non-limiting system 200 of FIG. 2. While the non-limiting method 900 is described relative to the non-limiting system 200 of FIG. 2, the non-limiting method 900 can be applicable also to other systems described herein, such as the non-limiting system 100 of FIG. 1. Repetitive description of like elements and/or processes employed in respective embodiments is omitted for sake of brevity.

At 902, the non-limiting method 900 can comprise identifying, by a system operatively coupled to a processor (e.g., obtaining component 210), a word-based input file (e.g., input file 228).

At 904, the non-limiting method 900 can comprise identifying, by the system (e.g., obtaining component 210) a set of data of a knowledge database (e.g., knowledge database 230) comprising domain data including categories (e.g., categories 234) having values (e.g., values 236).

At 906, the non-limiting method 900 can comprise outputting, by the system (e.g., identification component 214), a word subset (e.g., gram or ngram) based on the word-based input file.

At 908, the non-limiting method 900 can comprise assigning, by the system (e.g., evaluation component 218), a linking score to a word subset and category pair based on a rules-based process.

At 910, the non-limiting method 900 can comprise using, by the system (e.g., evaluation component 218), the linking score to map the word subset to the category.

At 912, the non-limiting method 900 can comprise declustering, by the system (e.g., declustering component 220), from a group of pairings of the word subset and categories, including the category and a second category, a pairing between the word subset and the second category, wherein the pairing has a lower linking score defining the pairing than a linking score defining the word subset and the category pair.

At 914, the non-limiting method 900 can comprise determining, by the system (e.g., declustering component 220), whether the word subsets are free of overlap with plural categories. If the answer is yes, the non-limiting method 900 can proceed to step 916. If the answer is no, the non-limiting method can proceed back to step 912 for additional declustering.

At 916, the non-limiting method 900 can comprise mapping, by the system (e.g., evaluation component 218), based on the rules-based process employing soft matching, the word subset to the category comprising the value for being correlated to the word subset.

At 918, the non-limiting method 900 can comprise mapping, by the system (e.g., mapping component 216), the word-based query to the category based on at least one of a highest linking score a defined priority or a defined threshold.

At 920, the non-limiting method 900 can comprise correlating, by the system (e.g., mapping component 216), the word subset to the value of the category to which the word subset has been matched.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to a process for matching a word subset to a database entity. A system can comprise a memory that stores computer executable components, and a processor that executes the computer executable components stored in the memory, wherein the computer executable components can comprise an identification component that outputs a word subset based on a word-based input file, and a mapping component that, based on a rules-based process employing soft matching, maps the word subset to a category comprising a value for being correlated to the word subset. The rules-based process employed by the mapping component can comprise word vector matching or fuzzy string matching.

An advantage of the above-indicated system can be providing for more reliable and globally accepted query response based on one or more domains that can be provided using existing frameworks, such as artificial intelligence model-based frameworks. That is, the system can provide the mapping to the category based on readily available, already-in-use domain knowledge databases, which are used by various programs, applications and/or operating systems of a respective computer system. Indeed, the system can provide the mapping absent a trained dataset and absent training datasets as is the required case for use of an artificial intelligence model.

Furthermore, the system can provide the mapping to the category absent a fully defined ontology and/or absent any ontology for one or more domains of a computer system.

Another advantage of the above-indicated system can be providing for automatic return of a response to a word-based input file, such as a query, question and/or request, wherein the word-based input file can be based on and/or referring to any domain of a plurality of domains, without knowledge of a sending entity of the word-based input file relative to any one or more domains. That is, even in a case where various units and/or subunits of a company, firm, organization and/or other group use plural domains for the defining of data at a same computer system (and/or aggregated computer system) the above-indicated system can provide schema-linking as if only a single domain exists.

In one or more embodiments of the aforementioned system, the rules-based process can comprise one or more of word vector matching or fuzzy string matching. In one or more embodiments of the aforementioned system, the rules-based process can comprise plural rules-based approaches. In this way, the system can address various word attributes, such as slangs, aliases, semantic tags and/or domain rules. Likewise, the system can function absent first completing a mention detection of the word-based input file. Instead, such precise relationship between the domain knowledge database and word subsets (e.g., grams) of the word-based input file can be managed by the rules-based process of the system.

Indeed, in view of the one or more embodiments described herein, a practical application of the one or more systems, computer-implemented methods and/or computer program products described herein can be ability to respond to a query with an answer, regardless of precise query wording relative to a domain for which a result is being requested. This response can be provided using a system that can employ one or even multiple soft matching processes without any need for a large, trained data set as is required for an AI model. Such is a useful and practical application of computers, thus providing enhanced (e.g., improved and/or optimized) querying and/or file searching operations. Overall, such computerized tools can constitute a concrete and tangible technical improvement in the fields of schema-linking, querying and/or domain searching.

Moreover, a device and/or method described herein can be scalable, such as where plural inputs (e.g., files and/or queries) can be evaluated and output results mapped relative to one or more domains, at least partially in parallel with one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to schema-linking, as compared to existing systems and/or techniques. Systems, computer-implemented methods and/or computer program products providing performance of these processes are of great utility in the fields of schema-linking, querying and/or database searching, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically provide schema-linking from a rules-based process, using one or more soft-matching processes to access electronically stored domain data as the one or more embodiments described herein can provide this process. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Turning next to FIG. 10, a detailed description is provided of additional context for the one or more embodiments described herein at FIGS. 1-9.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the keyphrase generation code 2000. In addition to block 2000, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 2000, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 2000 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface type operating systems that employ a kernel. The code included in block 2000 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine that collects and stores helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

The invention claimed is:

1. A system, comprising:
   a memory that stores computer executable components; and
   a processor that executes at least one of the computer executable components:
   outputs a word subset based on a word-based input file; and
   performs, based on a rules-based process employing soft matching implemented without using any trained machine learning model and without using any training dataset or predefined ontology for a domain beyond column names and values of a database schema, a mapping of the word subset to a category comprising a value for being correlated to the word subset, wherein performing the mapping comprises:
   computing, using the rules-based process, respective linking scores between the word subset and a plurality of categories of a database;
   applying one or more defined score thresholds to discard linkings having linking scores that do not satisfy the one or more defined score thresholds; and
   iteratively removing, from a group of remaining pairings between the word subset and the plurality of categories, all but a single pairing such that a final mapping of the word subset to the category is non-overlapping with respect to other categories of the plurality of categories.

2. The system of claim 1, wherein the rules-based process comprises word vector matching or fuzzy string matching.

3. The system of claim 1, wherein at least one of the computer executable components further:
   assigns a linking score to the word subset and category pair based on the rules-based process, wherein the mapping uses the linking score to map the word subset to the category.

4. The system of claim 1, wherein the mapping maps the word subset to the category based on a pairing of the word subset and the category having a higher linking score than a second pairing of the word subset with a second category.

5. The system of claim 1, wherein the iteratively removing comprises:
   removing, from a group of pairings of the word subset and categories, including the category and a second category, a pairing between the word subset and the second category, wherein the pairing has a lower linking score defining the pairing than a linking score defining the word subset and the category pair.

6. The system of claim 1, wherein the mapping between the word subset and the category comprises the non-overlapping mapping such that the word subset does not share any word with any other word subset that is mapped to a different category.

7. The system of claim 1, wherein performing the mapping occurs in response to the rules-based process resulting in a linking score for a pairing of the word subset and the category that satisfies a defined threshold.

8. The system of claim 1, wherein the value comprises a word match that relates to the word subset.

9. A computer-implemented method, comprising:
   outputting, by a system operatively coupled to a processor, a word subset based on a word-based input file; and
   performing, by the system, based on a rules-based process employing soft matching implemented without using any trained machine learning model and without using any training dataset or predefined ontology for a domain beyond column names and values of a database schema, a mapping of the word subset to a category comprising a value for being correlated to the word subset, wherein performing the mapping comprises:
   computing, using the rules-based process, respective linking scores between the word subset and a plurality of categories of a database;
   applying one or more defined score thresholds to discard linkings having linking scores that do not satisfy the one or more defined score thresholds; and
   iteratively removing, from a group of remaining pairings between the word subset and the plurality of categories, all but a single pairing such that a final mapping of the word subset to the category is non-overlapping with respect to other categories of the plurality of categories.

10. The computer-implemented method of claim 9, wherein the rules-based process comprises word vector matching or fuzzy string matching.

11. The computer-implemented method of claim 9, further comprising:
   assigning, by the system, a linking score to the word subset and category pair based on the rules-based process; and
   using, by the system, the linking score to map the word subset to the category.

12. The computer-implemented method of claim 9, wherein the mapping comprises:

mapping the word subset to the category based on a pairing of the word subset and the category having a higher linking score than a second pairing of the word subset with a second category.

13. The computer-implemented method of claim 9, wherein a first pairing of the word subset and the category has a lower linking score than a second pairing of the word subset with a second category, and wherein the category has associated therewith a defined priority over the second category.

14. The computer-implemented method of claim 9, wherein performing the mapping occurs in response to the rules-based process resulting in a linking score for a pairing of the word subset and the category that satisfies a defined threshold.

15. A computer program product facilitating a process for matching a word subset to a database entity, the computer program product comprising a computer readable storage medium having program instructions embodied therewith, the program instructions executable by a processor to cause the processor to:

output, by the processor, the word subset based on a word-based query; and perform, by the processor, based on a rules-based process employing soft matching implemented without using any trained machine learning model and without using any training dataset or predefined ontology for a domain beyond column names and values of a database schema, a mapping of the word subset to a category comprising a value for being correlated to the word subset, wherein performing the mapping comprises:

computing, using the rules-based process, respective linking scores between the word subset and a plurality of categories of a database;

applying one or more defined score thresholds to discard linkings having linking scores that do not satisfy the one or more defined score thresholds; and iteratively removing, from a group of remaining pairings between the word subset and the plurality of categories, all but a single pairing such that a final mapping of the word subset to the category is non-overlapping with respect to other categories of the plurality of categories.

16. The computer program product of claim 15, wherein the rules-based process comprises word vector matching or fuzzy string matching.

17. The computer program product of claim 15, wherein the program instructions are further executable by the processor to cause the processor to:

assign, by the processor, a linking score to the word subset and category pair based on the rules-based process; and use, by the processor, the linking score to map the word subset to the category.

18. The computer program product of claim 15, wherein the mapping comprises:

mapping the word subset to the category based on a first pairing of the word subset and the category having a higher linking score than a second pairing of the word subset with a second category, or mapping the word subset to the category wherein the first pairing of the word subset and the category has a lower linking score than a second pairing of the word subset with the second category, and wherein the category has associated therewith a defined priority over the second category.

19. The computer program product of claim 15, wherein the program instructions are further executable by the processor to cause the processor to:

correlate, by the processor, the word subset to the value of the category to which the word subset has been matched.

20. The computer program product of claim 15, wherein the iteratively removing comprises:

removing from a group of pairings of the word subset and categories, including the category and a second category, a pairing between the word subset and the second category, wherein the pairing has a lower linking score defining the pairing than a linking score defining the word subset and the category pair.

* * * * *